United States Patent
McCormick

(10) Patent No.: US 6,675,934 B1
(45) Date of Patent: Jan. 13, 2004

(54) SUSPENDED SCAFFOLD SURVEILLANCE SYSTEM

(76) Inventor: Paul L. McCormick, 923 S. Rifle St., Aurora, CO (US) 80017

( * ) Notice: Subject to any disclaimer, the term of this patent is extended or adjusted under 35 U.S.C. 154(b) by 0 days.

(21) Appl. No.: 10/260,988

(22) Filed: Sep. 30, 2002

(51) Int. Cl.$^7$ .................................................. E04G 3/10
(52) U.S. Cl. ...................... 182/129; 182/142; 182/150; 396/427
(58) Field of Search ............................ 182/129, 141, 182/150, 142; 396/427

(56) References Cited

U.S. PATENT DOCUMENTS

| | | | |
|---|---|---|---|
| 4,993,913 A | * 2/1991 | Ohtsuki | 414/729 |
| 5,158,023 A | * 10/1992 | Allen | 108/42 |
| 5,289,091 A | * 2/1994 | Wada | 318/282 |
| 5,355,818 A | 10/1994 | Strait et al. | |
| 6,264,001 B1 | 7/2001 | Herschbach | |
| 6,375,368 B1 | 4/2002 | Salvato et al. | |

FOREIGN PATENT DOCUMENTS

JP          254902 A  *  9/2001

OTHER PUBLICATIONS

Installation Operation Manual for Integrated Positioning System.
Installation Operation Manual DSP Color Camera.
User's Manual for Wireless CCD Observation System with Monitor.
Installation Operation Manual for Universal Keyboard.
Microtek Electronics, Inc., Mini Link, Pan, Tilt, Zoom Data Transceiver, Nov. 2001.
Installation Operation Manual for Integrated Camera System.

* cited by examiner

Primary Examiner—Alvin Chin-Shue
(74) Attorney, Agent, or Firm—Rick Martin; Patent Law Offices of Rick Martin, P.C.

(57) ABSTRACT

A suspended scaffold may be hung from a skyscraper, a ship's side or other structures where work on a surface is done by the workers on the scaffold. The surveillance system is a frame removably hung on the rails of the scaffold. A TV camera and transmitter is mounted to the frame. A remote TV/receiver allows a person on the ground to view the condition of the building. Optional pan, tilt, zoom features and a tilt alarm are disclosed.

7 Claims, 13 Drawing Sheets

SUSPENDED SCAFFOLD SURVEILLANCE SYSTEM

FIELD OF INVENTION

The present invention relates to the remote TV monitoring of workmen on a suspended scaffold, wherein workmen safety as well as building exterior conditions can be monitored.

BACKGROUND OF THE INVENTION

Motorized scaffolds routinely are raised and lowered along the sides of skyscrapers to allow workmen to clean windows, to repair flaws on the building surface, to prepare the building surface for painting, and to paint the building surface.

It is dangerous and expensive to load a building inspector onto a scaffold and position the scaffold for the inspector to eyeball inspect the condition of a particular area of the building's surface. Once the inspector sees and notes a defect or repaired defect of a building surface, then he has to be transported back to the top or bottom of the building to offload from the scaffold. This maneuver for a single inspection ties up the scaffold, the scaffold operator and the inspector. This equates to large costs.

The present invention greatly reduces these costs by allowing the inspector to remain on the ground. The inspector remotely operates a camera that is mounted on the scaffold, thereby accomplishing an eyeball inspection of a selected area of the building surface without tying up either the workmen or the scaffold. The inspector's time to inspect is also radically reduced. Since anything lifted high up on a scaffold can pose a significant hazard if it falls, the present invention provides for an inherently safe mounting of the camera and support equipment.

SUMMARY OF THE INVENTION

The primary aspect of the present invention is to provide a safe mount for a TV camera and its support equipment on a suspended scaffold.

Another aspect of the present invention is to provide a pan, tilt and zoom camera on the scaffold.

Another aspect of the present invention is to use a microwave transmitter for transmitting the TV signal to the ground.

Another aspect of the present invention is to provide a tilt warning system on the scaffold to give an audible alarm in case of a tilting of the scaffold.

Other aspects of this invention will appear from the following description and appended claims, reference being made to the accompanying drawings forming a part of this specification wherein like reference characters designate corresponding parts in the several views.

All scaffolds have side railings and a floor. The present invention uses these elements as structural support for a frame having a flat panel. The frame has hooks that rest over the railings. A pair of flanges clasp a floor member. The flat panel(s) supports an electronic's housing outbound from the railing to prevent damage from the workmen. The flat panel(s) also support a TV camera with the lens facing inbound toward the building. A pan, tilt, zoom camera is preferred. A ground operator has a control box with a receiver, a camera control and a viewing screen. Optionally a tilt alarm system is mounted on the scaffold's stage and railings to warn pedestrians that danger exists high above them such as caused by a windstorm.

For use on motorized scaffolding (swing stage), it mounts to a scaffold stage in approximately one minute. This system may also be configured for use on traditional scaffolding, boom lifts and other aerial work platforms.

Real time monitoring features quality control, safety, surface inspections, photographic and/or video record generation and after hours monitoring of a hanging stage by building security personnel in real time.

Fixed system specifications features wireless color microwave video/audio observation system, all components FCC approved, system transmits and receives a 2.4 GHz microwave signal in 1 of 4 separate, selectable channels, 5.6 GHz systems available, transmitter tethered to mounting frame via steel cable, entire system secured to stage using a heavy-duty cable lock, camera housing is tamper-resistant with moisture absorption packet and mineral lens. The system is weatherproof and measures 72" and weighs 35 pounds. The heat tolerance is −50 degrees F. to 122 degrees F. with a wind tolerance up to c100 mph. The system is one piece and compact and included a hand held monitor. Signal can be fed to a variety of optional video viewing systems, including, but not limited to computer screen, fixed monitor, and vehicle mounted video screen. The effective range is 1,500 feet; longer-range systems and customized configurations are available.

The pan, tilt, zoom specifications are wireless color microwave video/audio observation system, RF and microwave transmitter FCC approved, system transmits and receives a 2.4 GHz microwave signal in 1 of 4 separate, selectable channels, 5.6 GHz systems, ground control unit operates either via rechargeable battery pack or 110 volt AC. Components are enclosed in a rugged waterproof carrying case featuring military spec hardware. All components are protected via a customized foam pack. The transmitter if tethered to mounting frame via steel cable. The entire system is secured to stage using a heavy-duty cable lock. The camera housing is tamper-resistant with moisture absorption packet and mineral lens. The camera has a heater, window defroster, and sun shroud and insulation blanket. The camera pan capability is 360 degrees with continuous pan rotation. The camera tilt viewing range is +40 degrees to −90 degrees. The height is 92" and weighs 63 pounds. The heat tolerance is −50 degrees F. to 122 degrees F. with wind tolerant up to c90 mph. A hand held monitor is provided with the system. Signal can be fed to a variety of optional video viewing systems, including, but not limited to computer screen, fixed monitor, and vehicle mounted video screen. The effective range is 3,000 feet; longer-range systems and customized configurations are available.

This camera system can also be employed for use of aboard ships, relating to painting and hull maintenance. Workers in this environment are not visible to ship personnel monitoring the process. This system allows real time observation of the worker, the job being performed, stage conditions. Safety and quality control are greatly enhanced and are monitored in real time by supervisory personnel while on deck.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
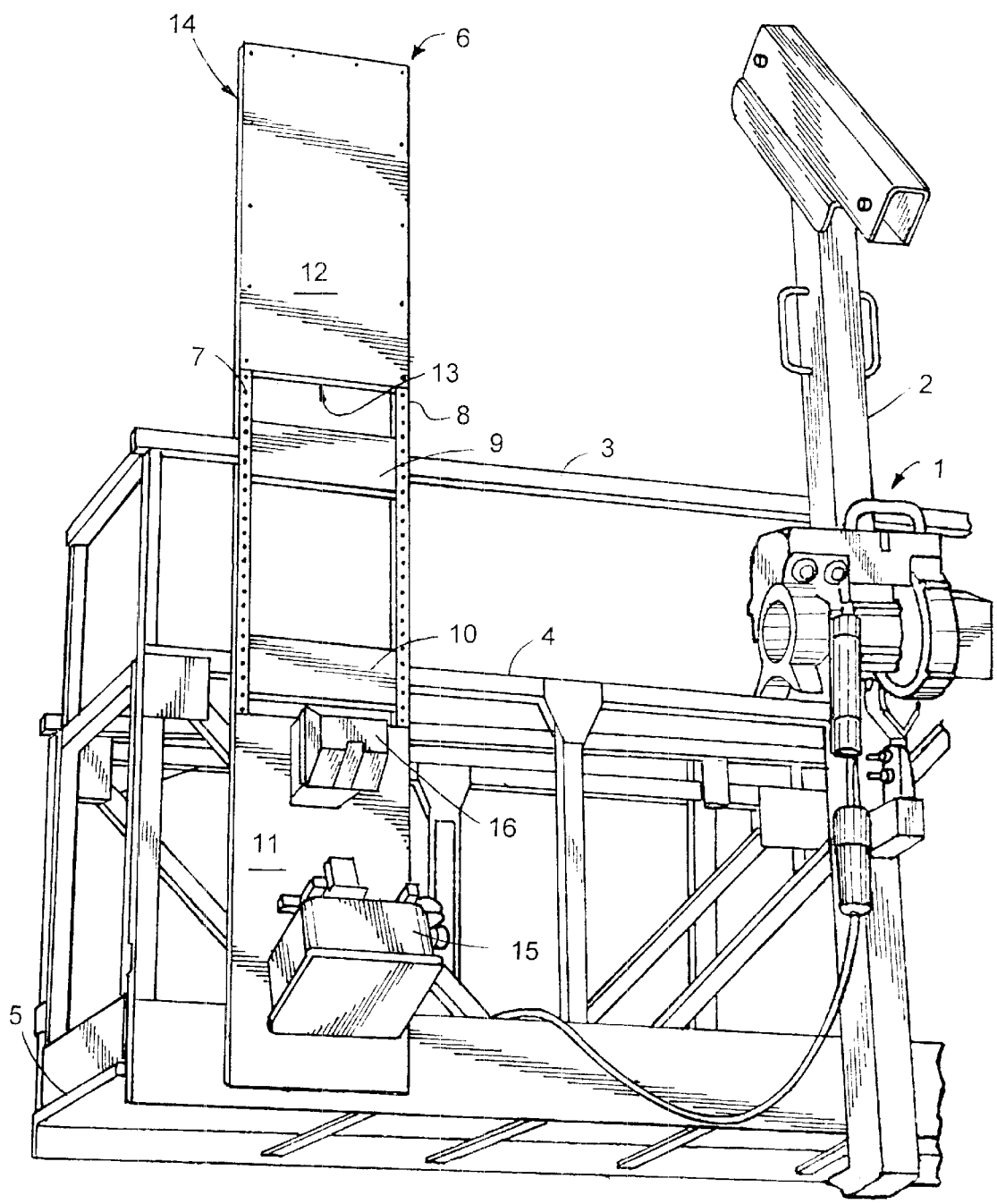
FIG. 1 is a bottom perspective view of a scaffold with the camera-mounting frame attached thereto.

Referring first to FIG. 1 a scaffold 1 has a lift mechanism 2, a rear top rail 3, a rear center rail 4 and a bottom 5. The camera frame 6 consists of a first vertical frame member 7, a second vertical frame member 8, a first cross beam 9, a second cross beam 10, a lower mounting plate 11, and an upper mounting plate 12. The rear upper mounting plate 12 has a heat insulator 13 sandwiched between a front upper mounting plate 14 and the rear upper mounting plate 12. An electronic's housing 15 is mounted to the lower mounting plate outbound of the scaffold's rear to protect it from the work area in the scaffold. A junction box 16 joins the wiring from the electronic's housing 15 to the chosen camera (not shown) which is mounted on the upper mounting plates 12,14.

Figure 2:
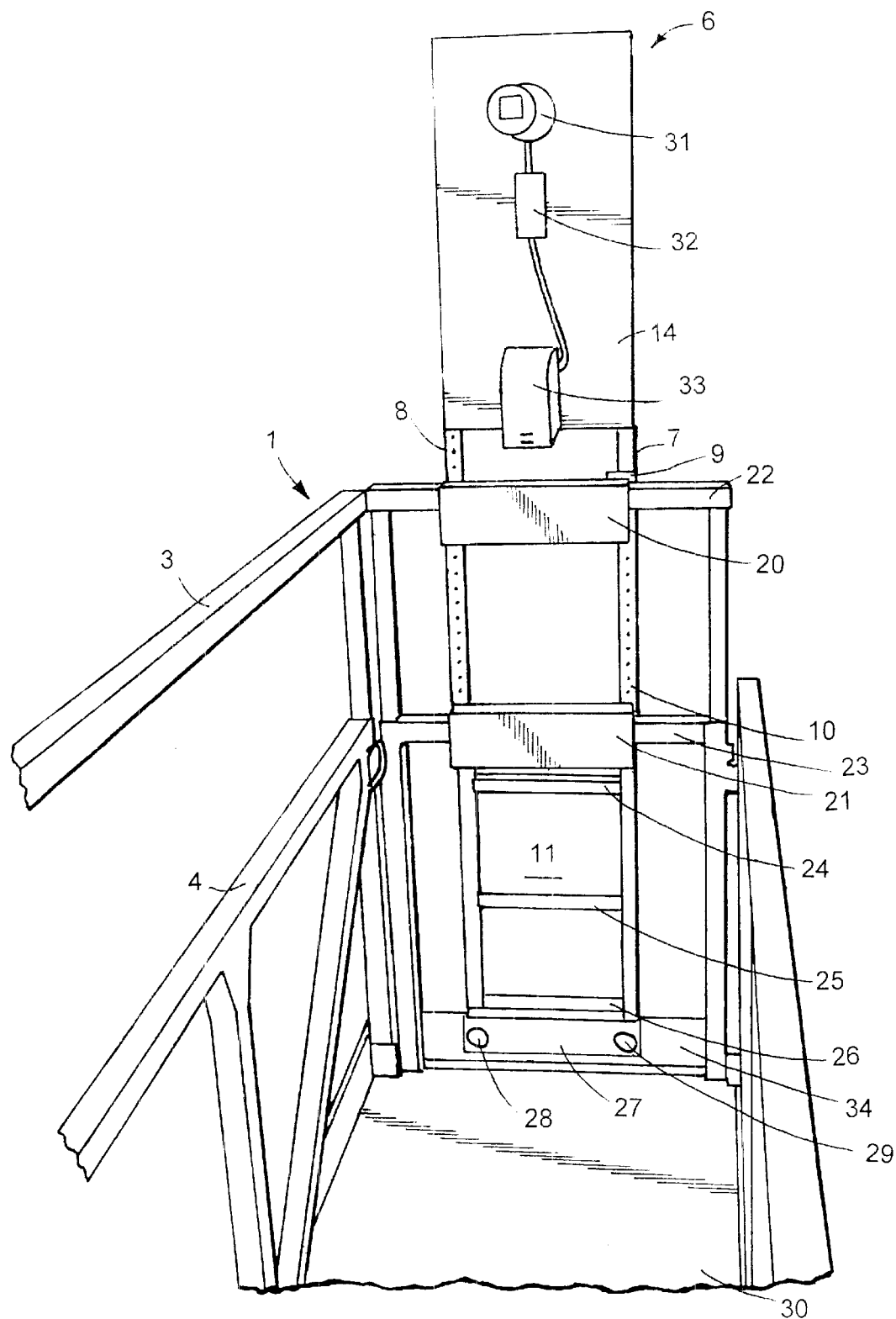
FIG. 2 is a top perspective view of the same camera-mounting frame of FIG. 1 mounted on an end of the scaffold rather than the rear.
Figure 3:
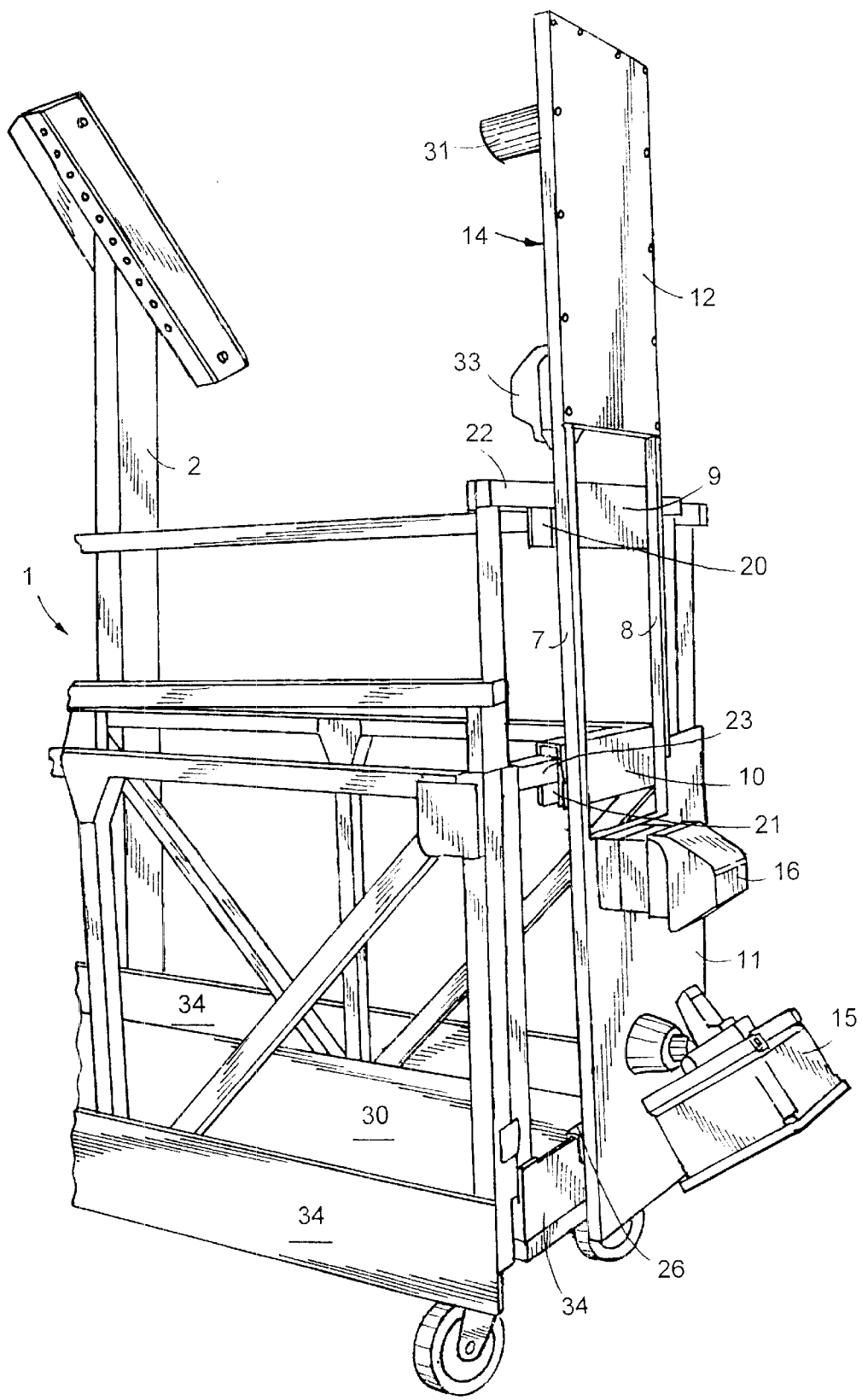
FIG. 3 is a front perspective view of the setup shown in FIG. 2.

Referring next to FIGS. 2,3 the side rails 22,23 support the channel brackets 20,21 which are part of the cross beams 9,10 respectively. Cross beams 24,25,26 also support the vertical frame members 7,8. Crossbeam 26 has a channel bracket 27 which is supported by the scaffold lower ledge 34. Bolt handles 28,29 are hand tightened to secure the channel bracket 27 to the scaffold lower ledge 34.

A simple TV camera 31 is mounted to the upper mounting plates 12,14. The 110V source 33 has an AC to 12V DC converter to power the camera 31 through junction box 32.

Figure 4:
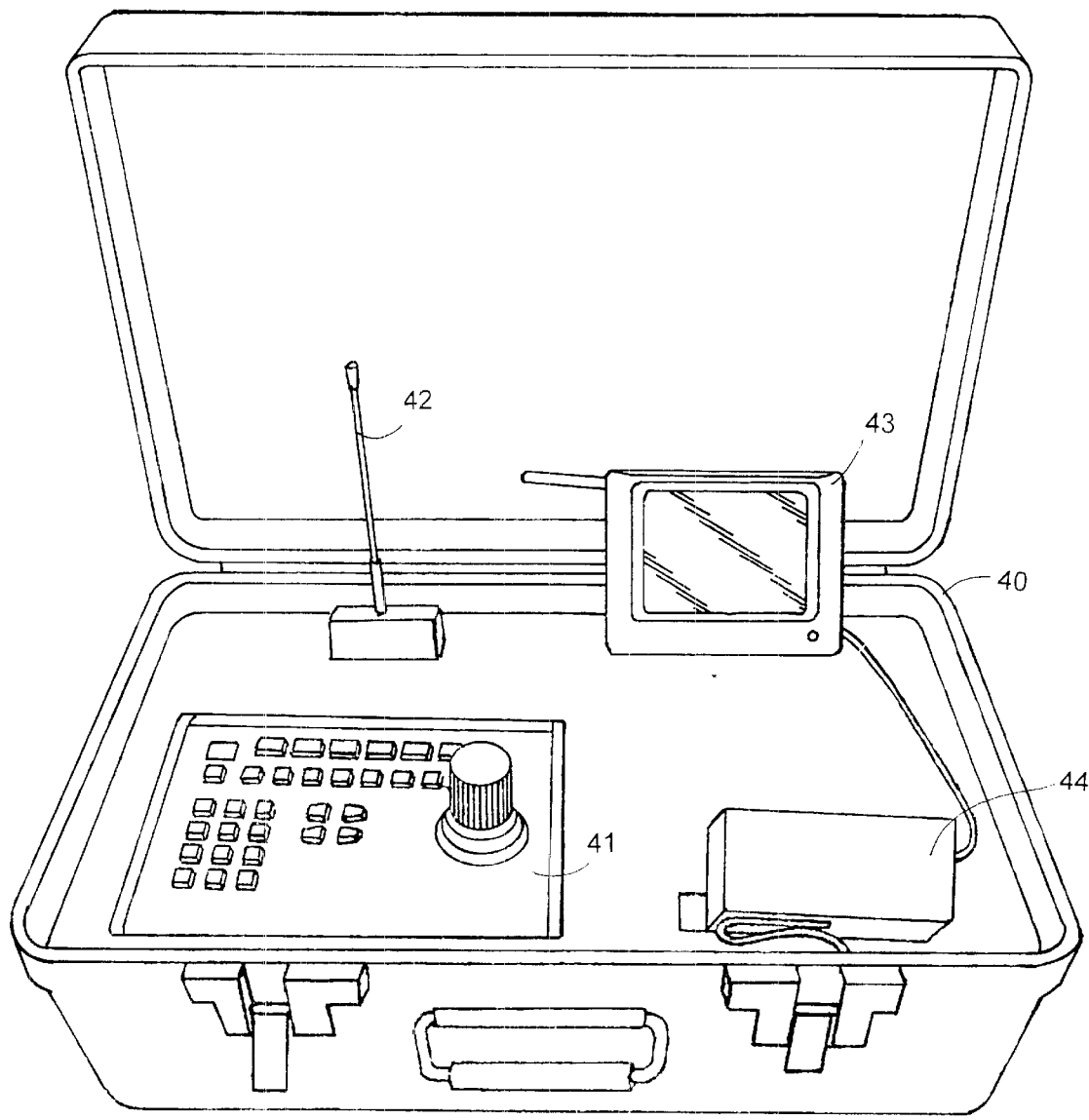
FIG. 4 is a top perspective view of the ground control box.

Referring next to FIG. 4 a remote control box 40 consists of a camera control console 41 which could be a Pelco® KBD-300A, and a camera controller and antenna 42. One such controller is a Microtek Electronics® PTZ-900. Simple cameras with no remote control features would not necessitate elements 41,42. One such camera is a Pelco® 300 series Cam closure. A portable mini screen and receivers 43 could be a COP™ 15-2400LR LCD monitor (www.cu1.com/cop2456tfmdn.html). A battery pack 44 can power the mini screen 43.

Figure 5:
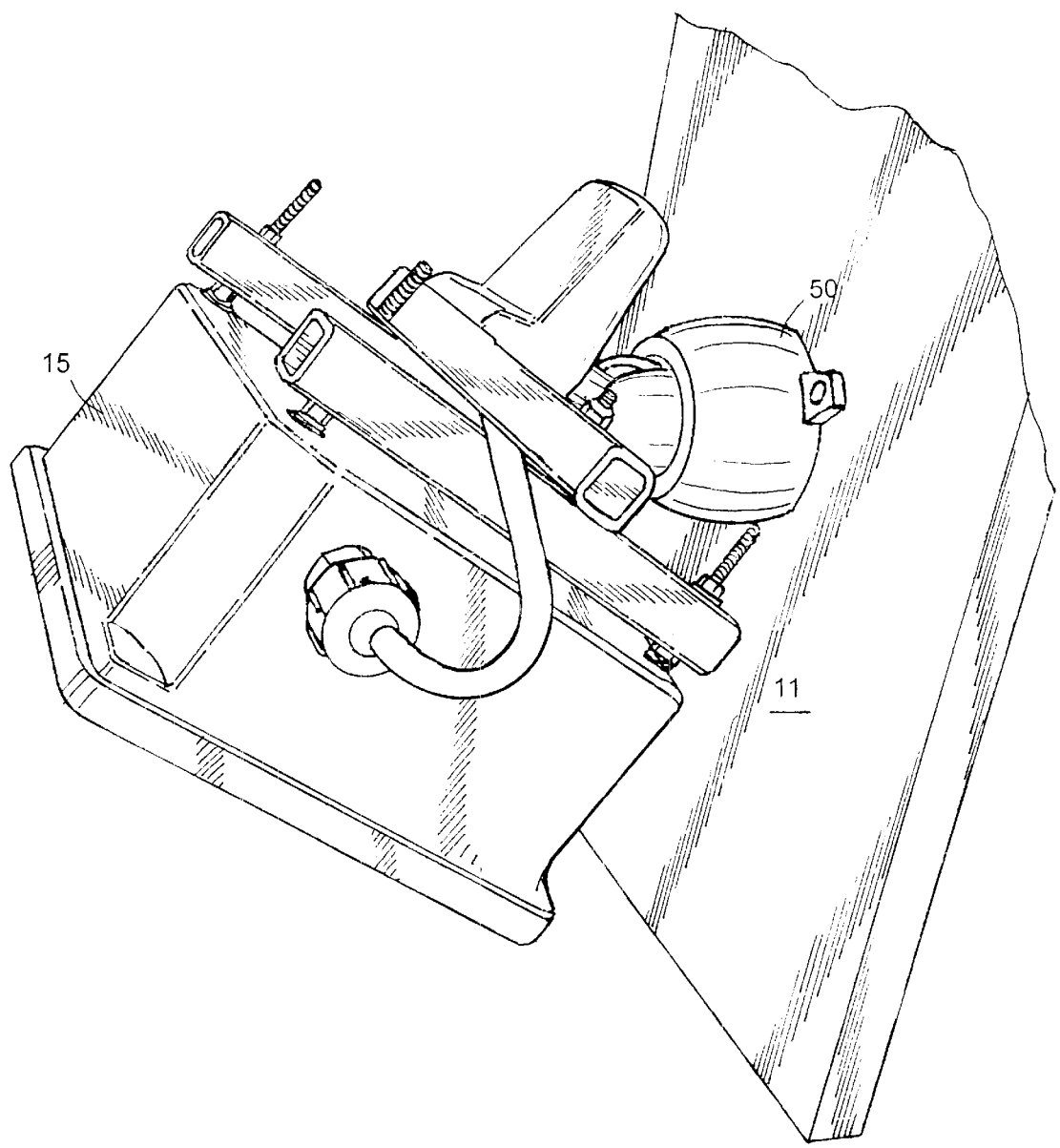
FIG. 5 is a top perspective view of the electronic's housing.

Referring next to FIG. 5 the electronic's housing 15 contains a directional microwave antenna. The gimbal mount 50 allows for the proper alignment of the antenna with the grounded and the portable mini screen 43.

Figure 6:
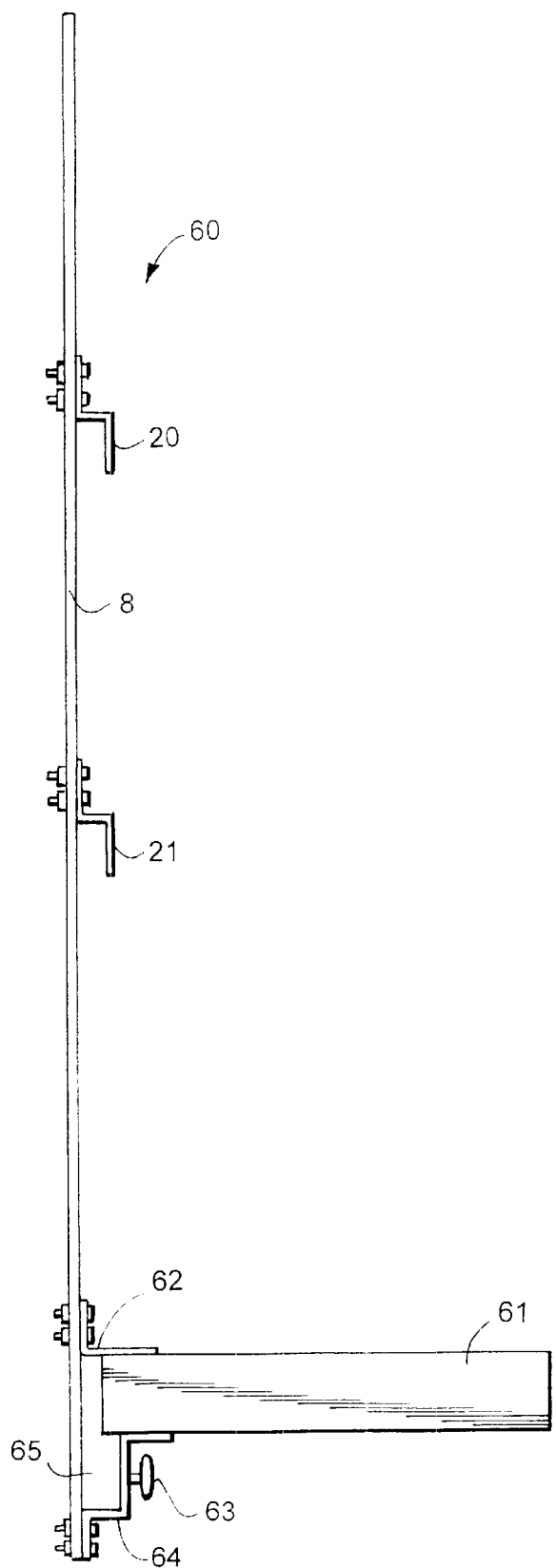
FIG. 6 is a side plan view of a camera frame designed for a first type of planked bottom scaffold.

Referring next to FIG. 6 a type 1 planked scaffold platform is accommodated by a frame 60. The lower angle bracket 6 is removed. Then the frame 8 is hung on the railings with the lower right angle bracket 62 resting on the plank 61. The plank 61 has a lower ledge 65. The angle bracket 64 is reinstalled, and the bolt handle 63 tightened to secure the angle bracket 64 to the lower ledge 65.

Figure 7:
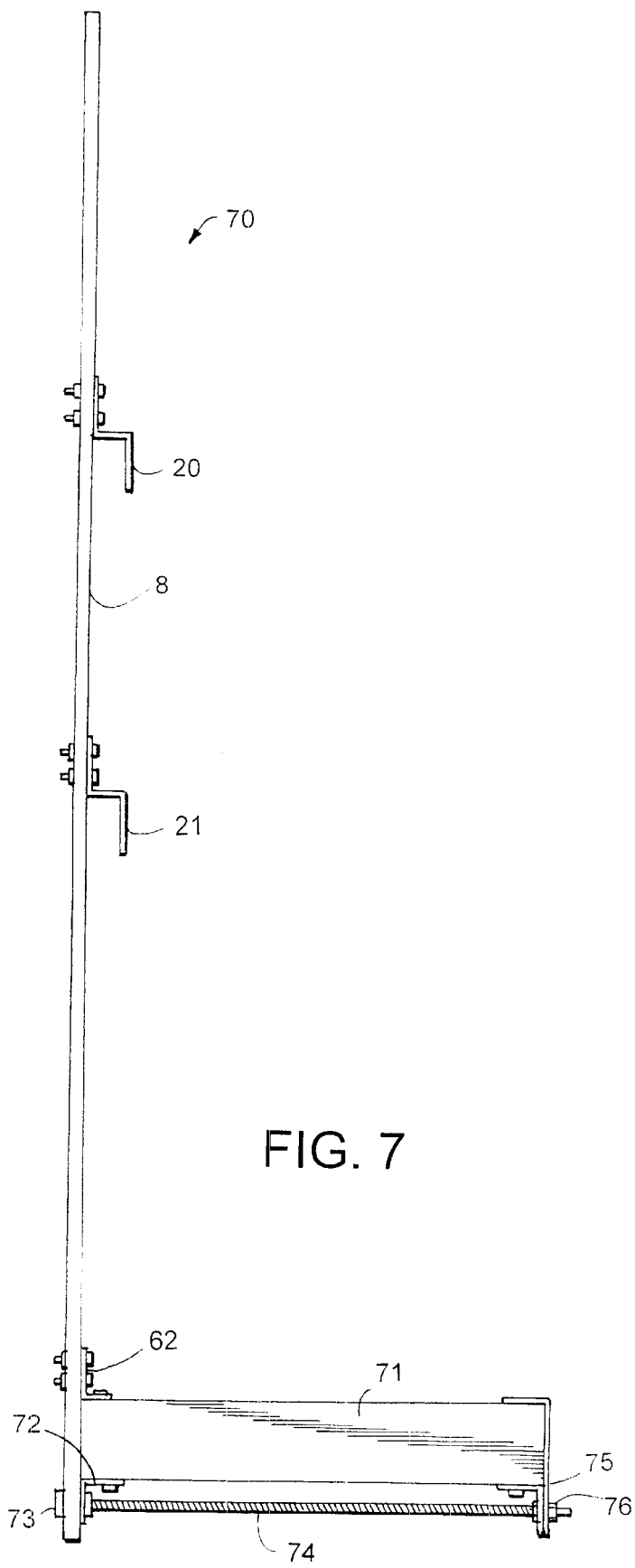
FIG. 7 is a side plan view of a camera frame embodiment designed for a second type of planked bottom scaffold.

Referring next to FIG. 7 a type 2 planked scaffold platform is accommodated by a frame 70. The lower right angle bracket 72 is removed along with cross bolt 74, nut 73 and C shaped bracket 75. Bolt 74 has head 76. The frame 8 is hung on the railings, and the top right angle bracket 62 rests on the plank 71. Next the C shaped bracket 75 is placed on the distal end of the plank 71, and the bolt 74 tightened to sandwich the plank 71 between the frame 8 and the C shaped bracket 75.

Figure 8:
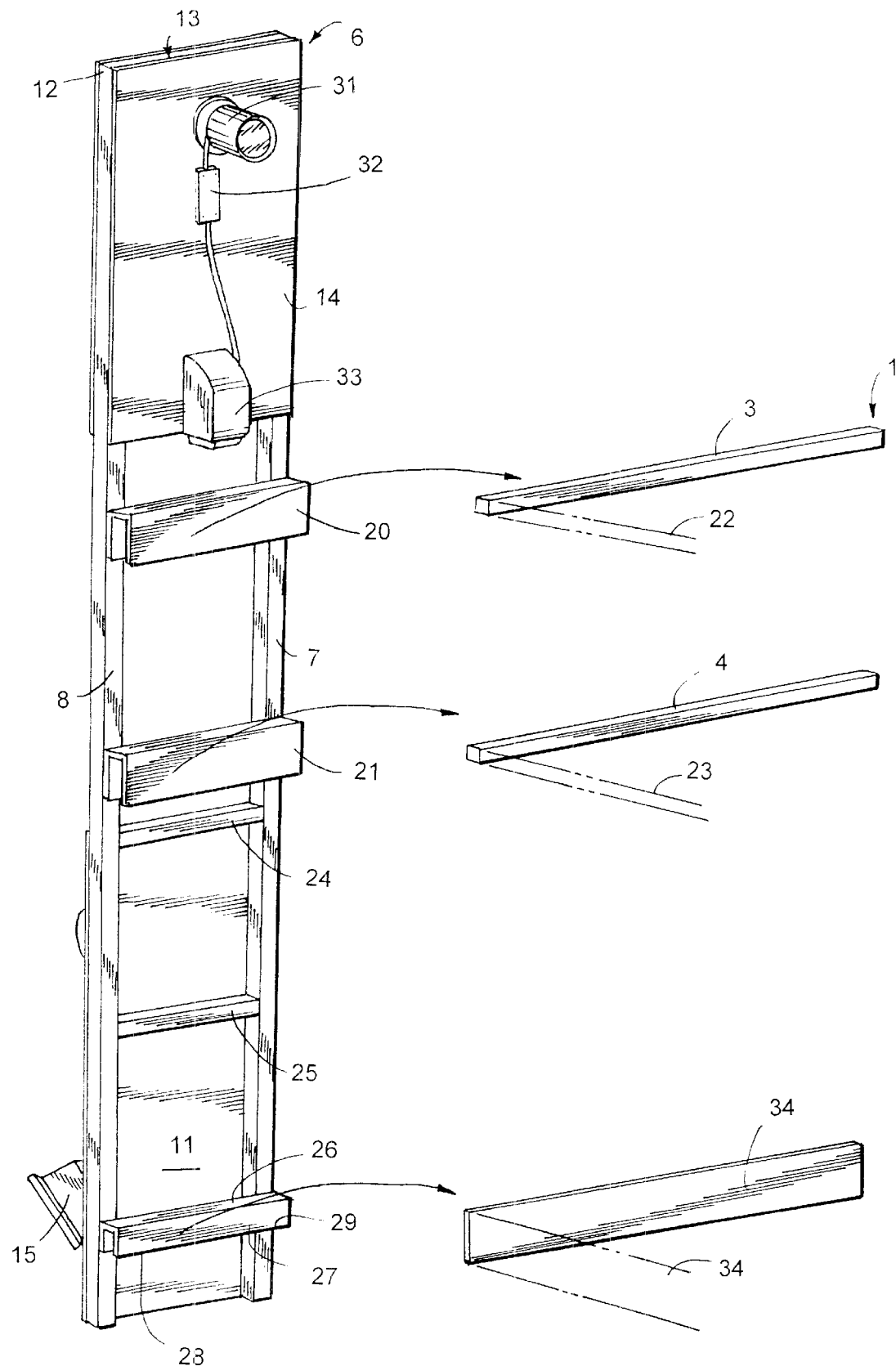
FIG. 8 is a front perspective view of the upper portion of the camera frame.

Referring next to FIG. 8 the preferred embodiment camera frame 6 is shown ready to mount to either a side or the rear of the scaffold 1.

Figure 10:
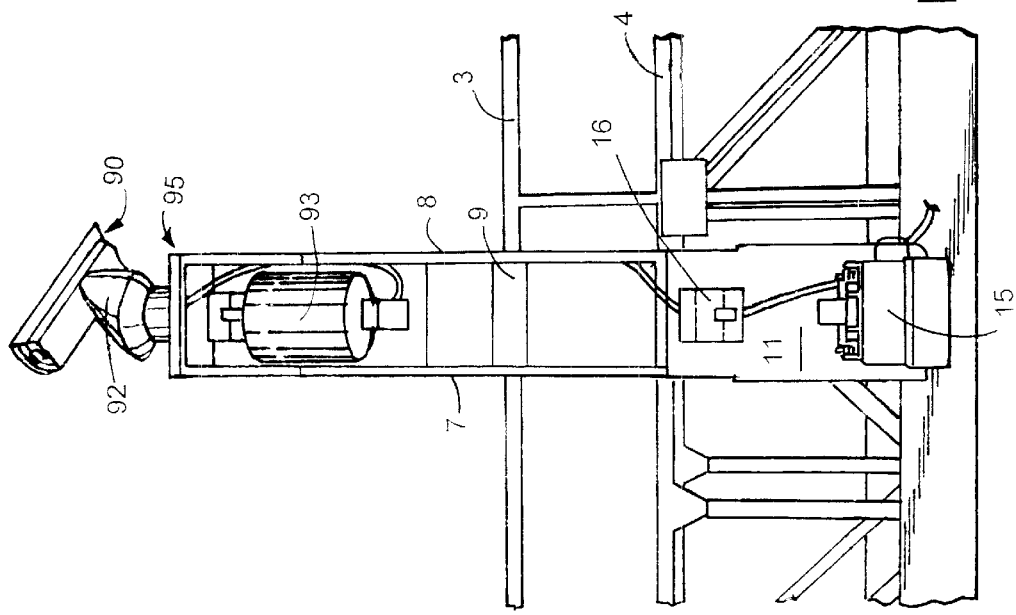
FIG. 10 is a front plan view of an entire camera frame with the pan, tilt, zoom camera of FIG. 9.
Figure 9:
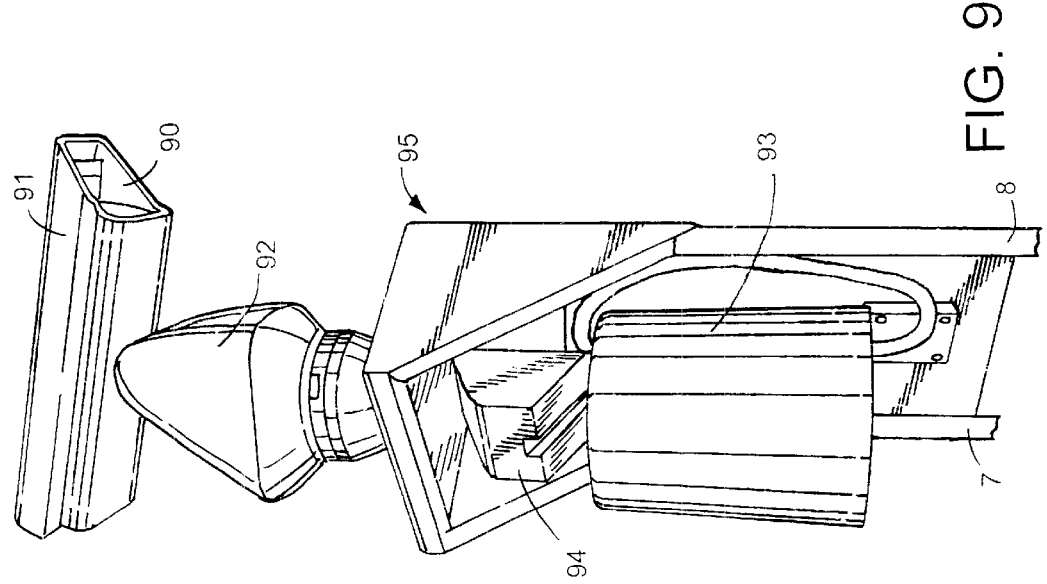
FIG. 9 is a front perspective view of pan, tilt, zoom camera and mount.

Referring next to FIGS. 9,10 the preferred embodiment pan, tilt, zoom camera 90 is shown. It could be a Pelco® ES 3012 series Esprit™ Integrated Positioning System with an internal Pelco® cc 3751H-2 DSP color camera inside. The pan, tilt of the hood 91 is controlled by the motor assembly 92. The housing 93 contains the radio control receiver. A junction box 94 connects the power and control wires from the housing 43 to the camera 90 and motor assembly 92.

Figure 11:
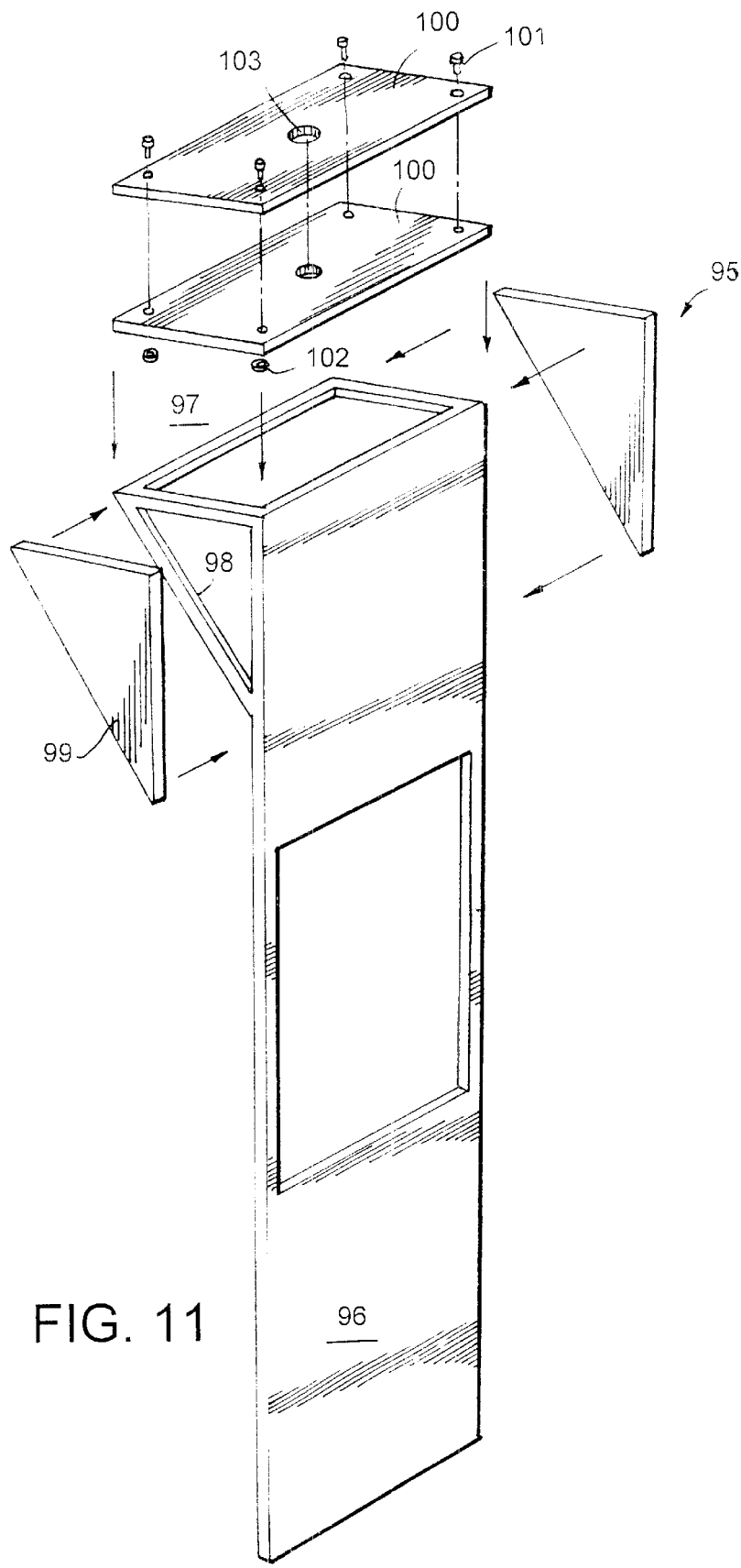
FIG. 11 is an exploded view of the mount for the pan, tilt, zoom camera.

Referring next to FIG. 11 the pedestal 95 attaches to frame members 7,8 as shown in FIG. 9. Bolts (not shown) fasten the vertical plate 96 to the frame members 7,8. A ledge 97 is supported by struts 98 which have side panels 95 further supporting the ledge 97. A pair of plates 100 are secured with bolts 101 and nuts 102 to the ledge 97. Holes 103 receive the motor assembly 92 shown in FIGS. 9,10.

Figure 12:
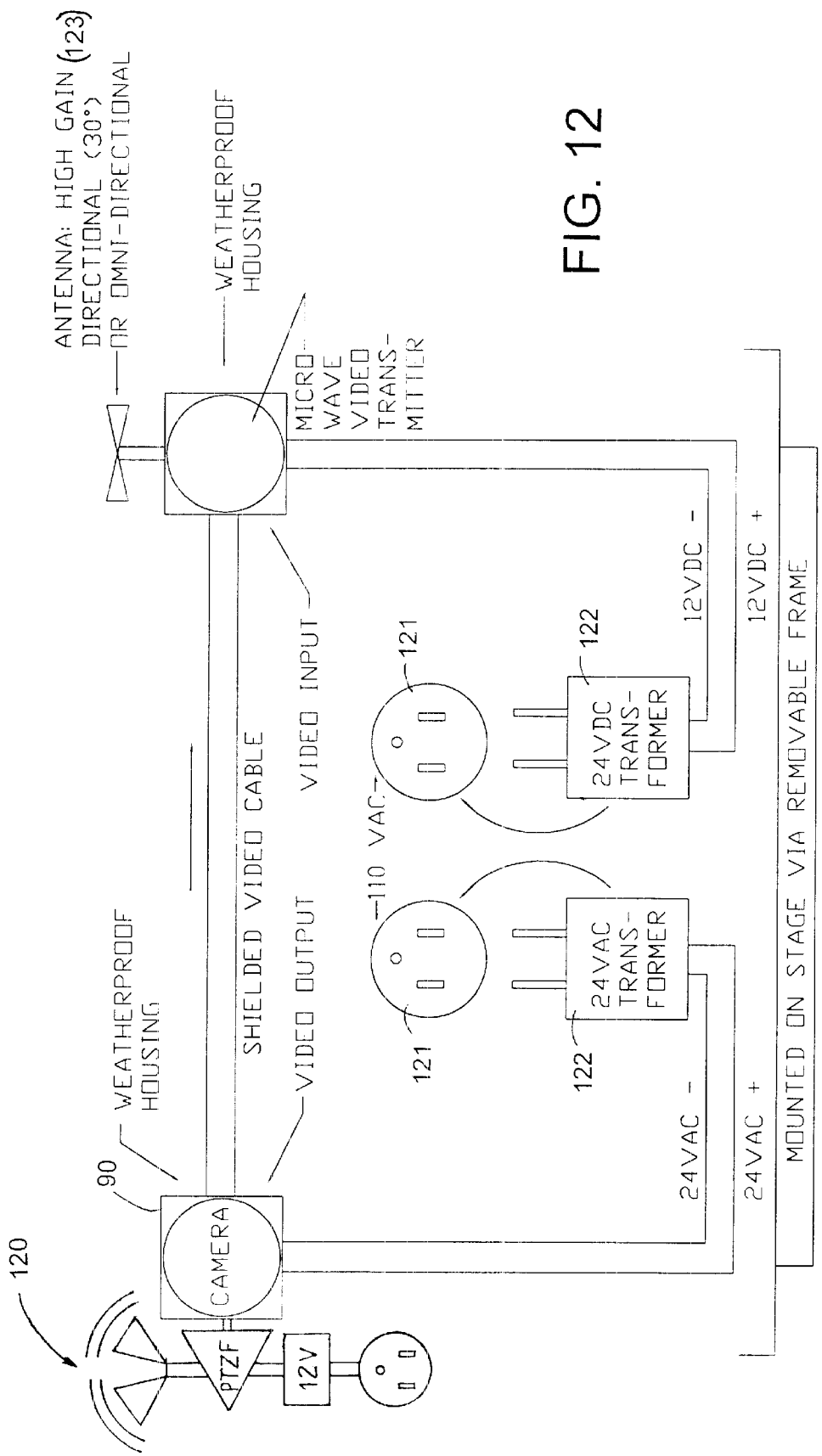
FIG. 12 is a schematic drawing of the scaffold mounted components of the system.

Referring next to FIG. 12 the schematic of the preferred embodiment pan, tilt, zoom camera 90 is shown. An RF receiver antenna 120 receives remote signals to control the camera 90 and its motor assembly 92. AC power is available on the scaffold at outlets 121. AC/DC converters 122 power the camera 90 and the directional microwave antenna and transmitter 123.

Figures 13, 14:
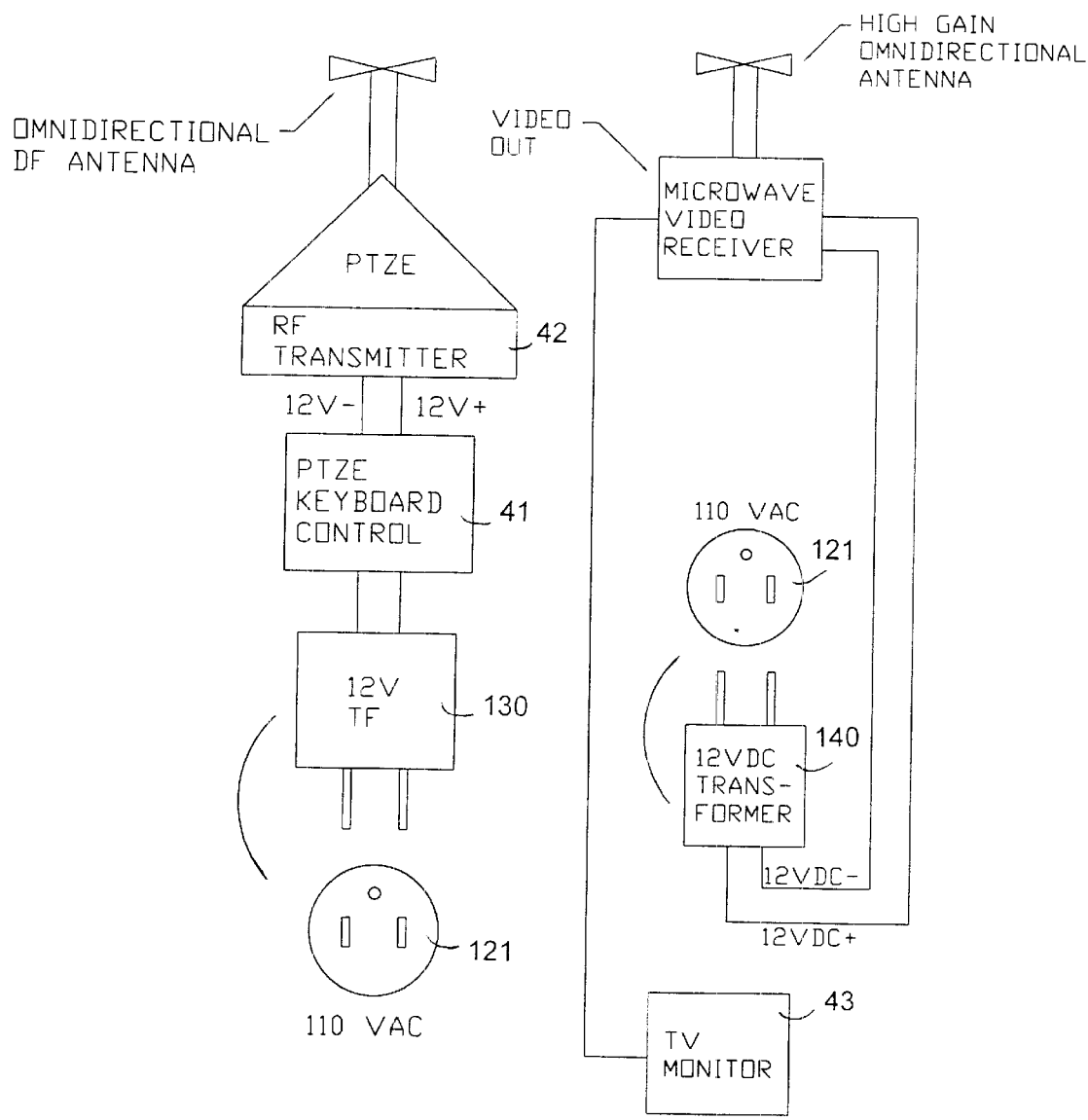
FIG. 13 is a schematic of the ground mounted camera control transmitter.
FIG. 14 is a schematic of the ground mounted video signal receiver.

On the ground the remote control box 40 of FIG. 4 houses the RF transmitter and antenna 42 shown in FIG. 13. A battery pack 130 powers the transmitter and antenna 42 and control console 41.

Referring next to FIG. 14 the mini screen and receiver 43 is shown powered by an AC/DC converter 140 rather than the battery pack 44 shown in FIG. 4.

Figure 15:
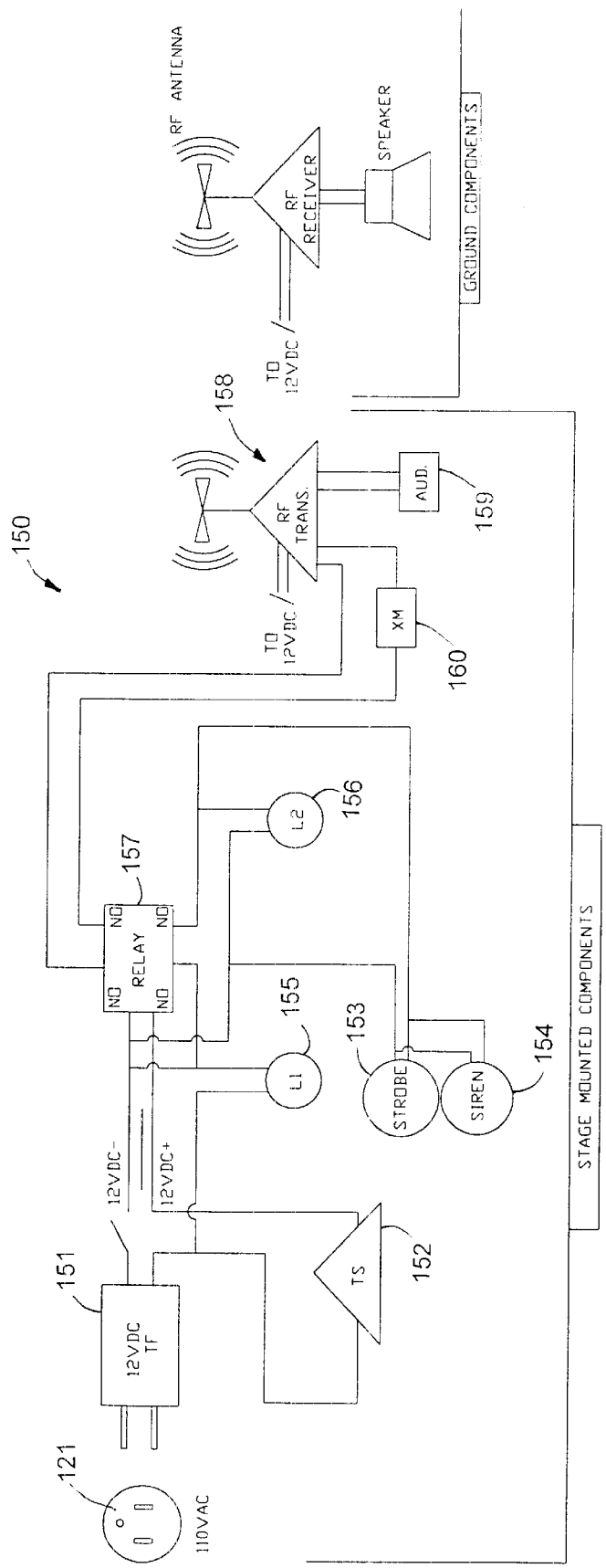
FIG. 15 is a schematic drawing of an optional tilt warning system.

Referring next to FIG. 15 an optional tilt warning system 150 could be mounted on the camera frame 6 of FIG. 1. AC power source 121 is preferably surge protected. Transformer 151 puts out 12V DC. The tilt switch 152 is normally open. It will tilt about +/−10–15° before closing. A weather proof strobe light 153 is powered by the tilt switch 152 as is the weather proof siren 154. Green light 155 shows the system is armed. Red light 156 shows the system is tripped. The double pole single throw relay 157 is normally open. The transmitter and antenna 158 is preferably 100–150 MHZ 2 watt with omni directional antenna. The audio signal generator/59 sends a prerecorded alarm message via the transmitter 158 to a ground receiver such as building security to alert them of a danger on a suspended scaffold. The transmit key 160 is optional and required by certain transceiver manufactures to turn the transmitter 158 on.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. In combination with a motorized scaffold having a floor, side rails, electric power source and a motorized lift assembly, an improvement comprising:

a vertical frame suspended from at least one rail member;

said vertical frame having a support connection to the floor;

a TV camera and transmitter which sends TV signals, each mounted to the vertical frame; and a remote TV and receiver which receive and display the TV signals.

2. The apparatus of claim 1 further comprising a first mounting panel section located above a top rail of the scaffold, and a second mounting panel section located below the top rail, wherein an electronics housing is mounted outbound from the scaffold on the second mounting panel section, and the TV camera is mounted on the first mounting panel section.

3. The apparatus of claim 2, wherein the TV camera is a pan, tilt, zoom camera, and the remote TV receiver has a TV controller and signal transmitter.

4. The apparatus of claim 1, wherein the vertical frame further comprises cross members with channel brackets to fit over the scaffold rails.

5. The apparatus of claim 2, wherein the first mounting panel section further comprises a front and a rear panel which sandwich an insulation therebetween, to protect the TV camera from heat from the sun.

6. The apparatus of claim 5, wherein the support connection to the floor further comprises a channel across the vertical frame which rests on an upward facing ledge which surrounds the floor, said channel across the vertical frame has a tightening bolt to lock the channel to the upward facing ledge.

7. The apparatus of claim 1 further comprising a tilt switch and alarm circuit to produce an audible alarm for a circuit to produce an audible alarm for a chosen tilt angle.

* * * * *